United States Patent [19]

Ehlers et al.

[11] 4,342,661
[45] Aug. 3, 1982

[54] HEAT STORAGE MEDIUM

[75] Inventors: Jörn Ehlers, Uetersen; Helmut Haukelt, Hamburg, both of Fed. Rep. of Germany

[73] Assignee: The British Petroleum Company Limited, London, England

[21] Appl. No.: 269,811

[22] Filed: Jun. 3, 1981

[30] Foreign Application Priority Data

Jun. 3, 1980 [DE] Fed. Rep. of Germany ....... 3020983

[51] Int. Cl.$^3$ .............................................. C09K 5/06
[52] U.S. Cl. .................................................. 252/70
[58] Field of Search ...................... 252/70; 165/104.17

[56] References Cited

U.S. PATENT DOCUMENTS 4,272,390  6/1981  Lane et al. ............................ 252/70
4,272,392  6/1981  Lane et al. ............................ 252/70

OTHER PUBLICATIONS

Energy Research, vol. 1, pp. 351–363 (1977).
Ashrae Journal, pp. 38–44, Sep. 1974.

Primary Examiner—Ralph S. Kendall
Attorney, Agent, or Firm—Morgan, Finnegan, Pine, Foley & Lee

[57] ABSTRACT

A heat storage medium contains (a) a sodium hydroxide in concentration from 60% by weight up to and including the stoichiometric concentration in sodium hydroxide monohydrate, (b) water in concentration from 40% by weight down to and including the said stoichiometric concentration, and (c) 0.1 to 2.0% by weight of tellurium dioxide, all percentages being expressed as percentages by weight of the total weight of sodium hydroxide and water. The tellurium dioxide reduces the tendency of the sodium hydroxide water system to supercool.

3 Claims, 1 Drawing Figure

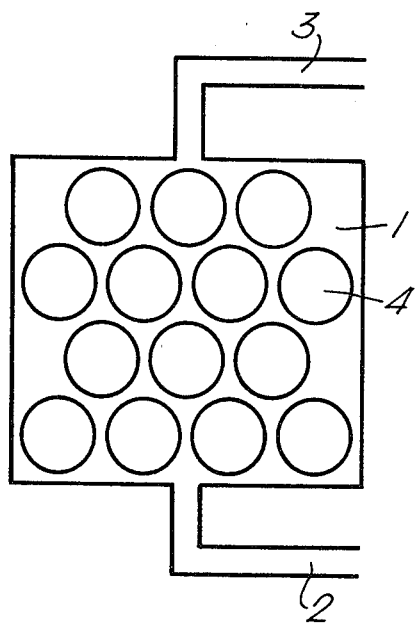

HEAT STORAGE MEDIUM

This invention relates to a heat storage medium containing sodium hydroxide, tellurium dioxide and water.

Heat storage systems in which the latent heat of fusion of a substance is utilised are known, for example, from Energy Research, Vol. 1, pages 351–363 (1977), and also from Ashrae Journal, September 1974, pages 38–44. The use of sodium hydroxide monohydrate as a heat storage medium is disclosed in CH-PS 363130 and the use of sodium hydroxide water compositions containing 64 to 74% by weight sodium hydroxide, together with a corrosion inhibitor, in DE-OS No. 2845865.

Heat storage media of the above mentioned type should comply with the following requirements:

1. The latent heat of fusion should be considerably greater than that of water.
2. The phase-change temperature should be substantially constant, i.e. the temperature difference between the charging (liquefying) and the discharging (solidifying) stage should be small.
3. The physical properties of the storage medium should not impose any special demands on the design of storage tanks.
4. The charging and discharging stages should be capable of being repeated as often as desired.

Attempting to select suitable heat storage media from thermodynamic data alone does not necessarily lead to success because supercooling of the melt frequently occurs before crystallisation takes place. Supercooling is undesirable in this context because it reduces the efficiency of the energy storage.

Means for reducing supercooling are known. The most effective is the addition of a substance which possess a similar crystalline structure to the heat storage medium but is insoluble in it and has a higher melting point. This acts as a nucleating agent by providing nuclei to initiate crystallisation of the storage medium. However, not every substance which satisfies these requirements in respect of a particular storage medium is capable of preventing supercooling of the medium. Therefore it is not possible to choose suitable combinations of heat storage medium and nucleating agent by theoretical considerations from thermodynamic and crystallographic data.

Sodium hydroxide water compositions having sodium hydroxide concentrations below and up to the stoichiometric concentration for sodium hydroxide monohydrate have a marked tendency to supercool. At sodium hydroxide concentrations between 60% by weight and the stoichiometric concentration, this amounts on average to 15 Centigrade degrees and can increase to 25 degrees.

It is an object of the present invention to provide a heat storage medium in which supercooling of the melt is reduced.

We have discovered that this object can be achieved by the addition of tellurium dioxide to the medium.

Thus according to the present invention there is provided a heat storage medium containing (a) sodium hydroxide in concentration from 60% by weight up to and including the stoichiometric concentration in sodium hydroxide monohydrate, (b) water in concentration from 40% by weight down to and including the said stoichiometric concentration, and (c) 0.1 to 2.0% by weight of tellurium dioxide, all percentages being expressed as percentages by weight of the total weight of sodium hydroxide and water.

Preferably the tellurium oxide is added to the heat storage medium in amount 0.1 to 0.5% by weight, most preferably 0.1%.

Preferably the heat storage medium contains 60 to 65% by weight of sodium hydroxide and 40 to 35% by weight of water. The lower limit of the sodium hydroxide concentration is set by the fact that the heat storage capacity of the system drops sharply below a concentration of 60%. The preferred upper limit marks the concentration at which tellurium dioxide begins to dissolve slowly in the medium.

If the tellurium dioxide is present in the undissolved form then supercooling is virtually eliminated.

A heat storage medium according to the present invention is suitable for use in the temperature range in which central heating units customarily operate (about 60°–70° C.). It has a high phase conversion enthalpy. A further advantage of this system is that during phase transition, only a slight alteration in density occurs so that storage tanks are not likely to be damaged because of an increase in volume of the contents.

The invention is illustrated with reference to the accompanying FIGURE which is a diagrammatic representation of a heat storage unit.

The heat storage unit comprises a heat exchanger 1 connected at its lower end by a line 2 to a source of heat or the return from a central heating system and at its upper end by a line 3 to the feed to the central heating system.

The heat exchanger 1 contains a number of spherical tanks 4 which contain the heat storage medium of the invention.

A heat transfer liquid is pumped through the heat exchanger.

Materials which are impermeable to the heat transfer liquid e.g. metal, are normally used in the construction of the tanks 4. Putting the heat storage medium into such tanks provides the advantage that the heat exchange surface can be determined by the shape of the tanks and stratification of the tellurium dioxide is prevented.

Water can be used as the heat transfer liquid in the heat exchanger as a result of which direct connection to a central heating system is possible.

We claim:

1. A heat storage medium containing (a) sodium hydroxide in concentration from 60% by weight up to and including the stoichiometric concentration in sodium hydroxide monohydrate, (b) water in concentration from 40% by weight down to and including the said stoichiometric concentration and (c) 0.1 to 2.0% by weight of tellurium dioxide, all percentages being expressed as percentages by weight of the combined weight of sodium hydroxide and water.

2. A heat storage system according to claim 1 containing 0.1 to 0.5% by weight of tellurium dioxide.

3. A heat storage system according to either one of the preceding claims 1 or 2 wherein the sodium hydroxide concentration is in the range 60 to 65% by weight and the water content is in the range 40 to 35% by weight.